United States Patent [19]

Fleischer

[11] 4,250,550

[45] Feb. 10, 1981

[54] FUEL DELIVERY CONTROL SYSTEM

[75] Inventor: Donald W. Fleischer, Wetherfield, Conn.

[73] Assignee: Veeder Industries Inc., Hartford, Conn.

[21] Appl. No.: 18,992

[22] Filed: Mar. 9, 1979

[51] Int. Cl.[3] .......................... G06F 15/56; B67D 5/14

[52] U.S. Cl. .................................... 364/465; 364/710; 222/23

[58] Field of Search ............................... 364/465, 710; 222/14–23, 25, 26, 28, 32–36

[56] References Cited

U.S. PATENT DOCUMENTS

| | | | |
|---|---|---|---|
| 3,356,836 | 12/1967 | Stenby | 364/710 |
| 3,878,377 | 4/1975 | Brunone | 364/465 |
| 3,895,738 | 7/1975 | Buchanan et al. | 364/465 X |
| 3,949,207 | 4/1976 | Savary et al. | 364/465 X |
| 3,984,032 | 10/1976 | Hyde et al. | 364/465 X |
| 4,034,193 | 7/1977 | Jackson | 364/465 |
| 4,067,486 | 1/1978 | Hyde et al. | 364/465 X |
| 4,074,356 | 2/1978 | Schiller et al. | 364/465 |

OTHER PUBLICATIONS

Calculators Supply Answers Audibly or in Braille; Electronics Review, Nov. 27, 1975, pp. 39–40.

Talking Calculator Announces Keystroke,Answer; New Equipment Digest, Apr. 1976, p. 6.

Single Silicon Chip Synthesizes Speech in $50 Learning Aid; Electronics Review, Jun. 22, 1978, pp. 39–40.

*Primary Examiner*—Edward J. Wise

*Attorney, Agent, or Firm*—Prutzman, Kalb, Chilton & Alix

[57] ABSTRACT

A gasoline station with self-service and attendant-operated fuel dispensing areas and a fuel delivery control system with a central control station for activating each self-service dispenser and registering the amount of fuel delivered thereby, an auxiliary control station at the attendant-operated area for remote attendant activation of each self-service dispenser and voice annunciator means for voice annunciation of the cost amount of each completed self-service delivery for facilitating attendant collection of payment.

12 Claims, 2 Drawing Figures

FUEL DELIVERY CONTROL SYSTEM

BRIEF SUMMARY OF THE INVENTION

The present invention relates to fuel delivery control systems having notable utility with hybrid fuel stations having both self-service and attendant-operated fuel dispensing areas for individually controlling fuel deliveries at each self-service dispenser while providing attendant operation of attendant-operated dispensers.

It is a primary aim of the present invention to provide a new and improved fuel delivery control system which facilitates attendant operation of one or more fuel dispensers while controlling other self-service deliveries of fuel and collecting payment from each self-service customer for the fuel delivered.

It is another aim of the present invention to provide a new and improved fuel delivery control system having both central and remote dispensing control stations and notably useful with hybrid gasoline stations having both attendant-operated and self-service gasoline dispensing areas.

It is a further aim of the present invention to provide a new and improved fuel delivery control system for a self-service fuel station which provides improved flexibility in controlling and collecting payment from each self-service customer for the fuel delivered.

It is another aim of the present invention to provide a new and improved fuel station delivery control system which is operable by one or more station attendants for controlling the self-service fuel deliveries from a large number of fuel dispensers while providing attendant delivery at one or more fuel dispensers and/or other attendant services.

It is a further aim of the present invention to provide a new and improved fuel delivery registration system which provides voice annunciation of the cost amount of each completed gasoline delivery.

It is another aim of the present invention to provide a new and improved self-service fuel station delivery control system which provides for control of and payment for each fuel delivery at a central pay station and also remotely thereof by a service station attendant or other employee.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
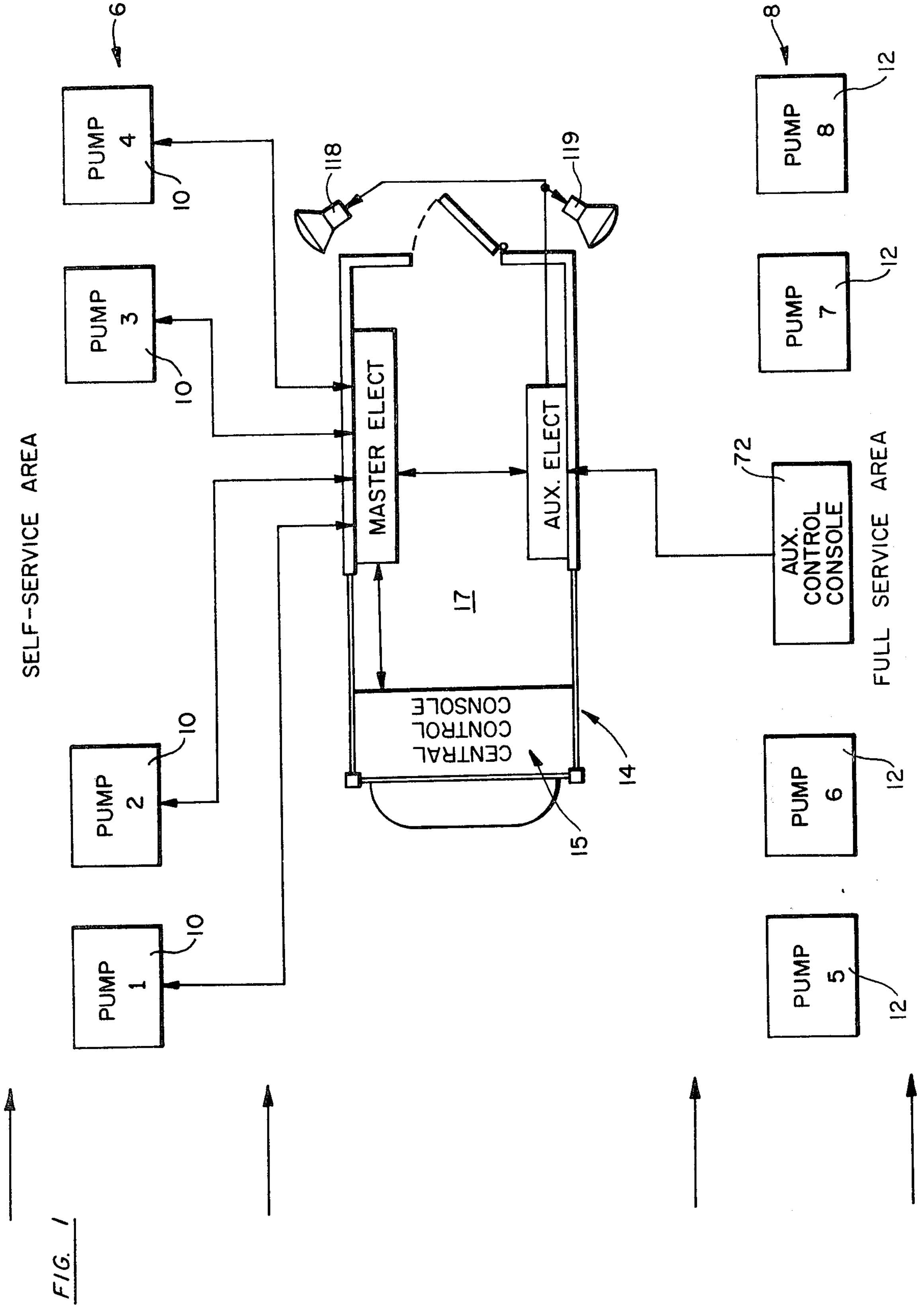
FIG. 1 is a generally diagrammatic view, partly broken away and partly in section, of a hybrid fuel station having self-service and attendant-operated fuel dispensing areas and employing an embodiment of a fuel delivery control system of the present invention.
Figure 2:
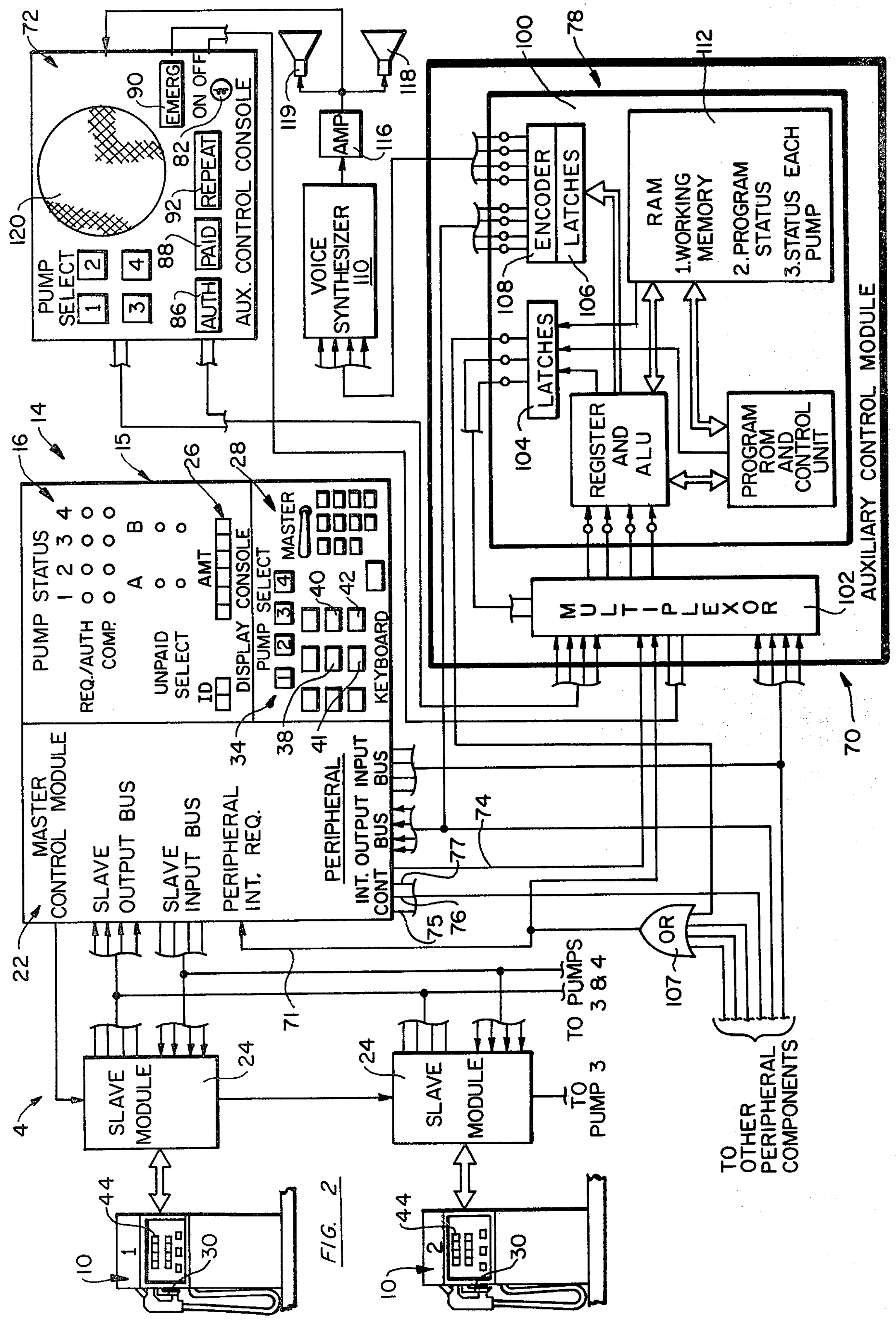
FIG. 2 is a partial diagrammatic view, partly broken away, showing the fuel delivery control system in more detail.

Referring now to the drawings in detail, wherein like numerals represent like parts, an embodiment 4 of a fuel station delivery control system incorporating the present invention is shown employed in a hybrid fuel station having a self-service area 6 with four generally conventional self-service fuel pumps or dispensers 10 which are remotely controlled as hereinafter described and an attendant-operated or full service area 8 with four generally conventional attendant-operated fuel pumps or dispensers 12 which in the shown hybrid station are not connected to be remotely controlled for self-service operation.

The fluid delivery control system 4 comprises a primary operating system 14 with a central pay station console 15 having a plurality of manually operable controls and a visual display section 16 for selectively displaying the cost and volume of each fuel delivery from the four self-service pumps 10. The console 15 is preferably located at a central pay station 17 to permit a console operator to view a dispensing operation at each of the self-service pumps 10 as well as to control and register each delivery. The central pay station console 15 has primary utility in providing for self-service delivery of fuel from each self-service pump 10 and such that each self-service customer can handle his own fuel delivery after appropriate authorization is given by the console operator and pay the console operator after the delivery.

For simplifying the description of the present invention, the primary operating system 14 is shown to be the type disclosed in U.S. patent application Ser. No. 002,310 (assigned to the same assignee as the present application) of Robert J. Schiller et al, filed Jan. 10, 1979, and entitled "Fuel Delivery Control and Registration System." Therefore, the primary operating system 14 and its console 15 are not shown or described in detail and only the novel features of the present invention are shown and described in detail, and reference should be made to U.S. patent application Ser. No. 002,310 for the details of the primary operating system 14, including its console 15, its connection to each self-service fuel pump 10 and the system and operation of each self-service fuel pump 10.

Briefly, however, the primary operating system 14 comprises the console 15, a master pump control and information storage module 22, and a slave pump control and information storage module 24 for each self-service dispenser 10 for separately accumulating and storing (a) the cost amount of each of two separate A and B fuel deliveries by the respective dispenser; and (b) the existing status of each A and B delivery (i.e., delivery authorized, on, completed and unpaid, or completed and paid).

The console display section 16 has a plurality of LED indicators, a two-digit identification register 25, and a six-digit cost/volume register 26, and a keyboard 28 of the console 15 has a plurality of manually operable switches for manual operation of the primary operating system 14. The cost/volume register 26 is operable by the keyboard 28 to selectively display (a) the cost amount of each A and B fuel delivery of each dispenser (stored in the respective slave module 24) and the corresponding volume amount of each delivery (which is computed by the master module 22 from the cost amount stored in the slave and a unit volume price for the respective fuel product stored in the master).

The keyboard push button switches comprise a bank 34 of four pump selector buttons for individually selecting the four dispensers 10. When a pump selector button is pressed, the selected pump is displayed by the two-digit identification register 25, and the six-digit cost- /volume register 26 displays the cost amount of gasoline dispensed by the selected dispenser. The cost amount is automatically displayed, and a $/VOL push button 38 is operable to switch the display to the corresponding volume amount (calculated by the master module) or back to the cost amount. Also, where only one unpaid transaction is stored in the slave, that transaction is automatically displayed; where two unpaid transactions are stored in the slave, the earlier unpaid transaction is automatically displayed, and where there are no unpaid transactions stored in the slave, the A register amount is automatically displayed. The operator can switch the display to the other transaction by pressing an A/B select push button 40. If a pump delivery is selected while in process, the running amount is displayed. A and B delivery SELECT indicators are alternatively energized to indicate which delivery of the selected pump is displayed, and A and B delivery UNPAID indicators are individually energized to indicate that the respective delivery of the selected pump has been completed (by turning the respective pump control handle 30 off) and has not yet been marked paid (by actuating either a CASH push button 41 when a cash sale is made or a CREDIT push button 42 when a credit sale is made when that delivery is displayed by the cost/volume register).

In a manual or local control mode, for example for attendant operation of the dispensers 10, although prior authorization at the central control station is not required and the pump is controlled by the pump handle, the cost and volume amounts of each delivery are added to slave and master totals at the end of the delivery when the pump control handle is turned off to provide complete cost and volume accountability of all deliveries by the dispensers 10. Also, the primary operating system 14 could be explained to include the full service area dispensers 12, for example to use those dispensers for self-service delivery of fuel during certain times and/or to include the dispensers 12 in the cost and volume accounting system.

The fuel delivery control system 4 has three primary levels of interfacing. These are between each dispenser 10 and its respective slave module 24, between the slave modules 24 and the master module 22, and between the master module 22 and each peripheral component or controller provided for remotely controlling the fuel pumps 10 and/or remotely registering any or all of the information adapted to be displayed by the display section 16.

During the delivery of fuel, a suitable rotary pulse generator (not shown) connected to a pump register cost counter 44 is rotated to generate a train of cost pulses with a pulse for each predetermined incremental cost amount of fuel delivered (e.g., a pulse for each one cent or one-tenth of a cent of fuel delivered). The cost pulses are transmitted to the slave module 24 to accumulate the cost amount of the individual fuel delivery in the slave module.

When a pump is authorized, the authorization status is stored in the slave module 24, and the subsequent pump delivery can be made without further communication between the slave and master. The entire slave module is dedicated entirely to controlling the respective pump and accumulating the cost amount of the authorized fuel delivery.

The master module 22 communicates with the slave modules 24 via a common four bit slave input bus and a common four bit slave output bus. The slaves 24 are individually (sequentially but asynchronously) activated for communication with the master 22 in a handshaking transmission and response procedure. When a slave 24 is activated by a sequence signal, the slave 24 transmits its current pump status via the slave output bus to the master. Thus, only one slave 24 at a time is activated to transmit a message to the master 22 via the slave output bus or receive a message from the master 22 via the slave input bus.

Upon receiving a status message from a slave 24, the master 22 responds by transmitting a reply message in hexadecimal format (which may merely acknowledge the slave status message or authorize or deauthorize the pump 10 or may request data stored in the slave memory or advise the slave to store revised data forthcoming from the master 22) via the slave input bus to the active slave 24. As may be required, four bit messages in hexadecimal format are then successively transmitted by the master and slave (either immediately or during the following slave sequence cycle) in a handshaking transmission and response procedure to complete a communication.

After the completion of a communication between a slave 24 and the master 22, the next slave 24 in the sequence is activated. Upon the completion of a slave sequence cycle, a succeeding cycle is then initiated by the master 22. Communications between the master and a slave can be temporarily interrupted as necessary (after receipt of a slave status message) to free the master for internal communication and/or communication with a peripheral component.

In addition to the slave output bus, a common peripheral output bus for the auxiliary or peripheral controllers, of which only one peripheral controller 70 is shown, and a common peripheral interrupt request line 71 from the peripheral controllers are connected as inputs to the master module 22.

Data is transmitted (in hexadecimal format) between each peripheral controller and the master module 22 via a common peripheral input bus and the common peripheral output bus. Each of up to four peripheral controllers is selectively activated by a respective master interrupt control 74–77 connecting the master 22 with the peripheral controllers. Also, each peripheral controller is connected via an OR gate to provide a single common peripheral interrupt request input 71 to the master 22. An interrupt is initiated by the master 22 by transmitting an interrupt control signal to the selected peripheral and is initiated by a peripheral by transmitting an interrupt request signal to the master 22 via the common peripheral interrupt request line 71. Each peripheral is connected so that an interrupt request signal from one peripheral to the master or an interrupt control signal from the master to one peripheral will forestall communications with the remaining peripherals. After peripheral identification is established, the active peripheral and master communicate in the same manner as a slave 24 and the master 22.

In accordance with the present invention, the peripheral controller 70 provides an auxiliary remote control system for use by a station attendant while he is delivering fuel at the attendant-operated gasoline dispensers 12 (or alternatively, for example, while he is providing attendant services to self-service customers and/or other customers). The auxiliary controller 70 comprises an auxiliary control unit or console 72 located at the attendant-operated dispensing area 8 and an auxiliary control module 78 preferably located at the postpay station and which provides an interface connection to the master module 22. The auxiliary console 72 has an on-off key lock 82 and whereby when the key lock 82 is turned to its "on" position, the auxiliary controller 70 is activated to enable the remote console 72 to communicate with the master module 22 via the auxiliary control module 78 and via the peripheral input bus and peripheral output bus.

The auxiliary console 72 has four pump select push button switches for individually selecting the four self-service pumps 10, a single pump authorization select push button switch 86; a paid select push button switch 88; an emergency select push button switch 90; and a repeat select push button switch 92. For simplicity of operation, the auxiliary controller 70, when activated by the key lock 82, preferably provides for automatically deactivating the additional B delivery capability of the primary operating system 14 and whereby each self-service delivery must be cleared (by depressing one of the payment buttons 41, 42 or 88) before the same dispenser 10 can be used again to dispense another self-service delivery. Alternatively, an A/B delivery select push button switch (not shown) and A/B indicator light (not shown) can be provided on the auxiliary control console 72 to select and indicate the A or B delivery in the manner of the central station console 15.

Accordingly, when the key lock 82 is positioned to enable the auxiliary control console 72, each of the self-service pumps 10 may be individually activated for delivering fuel by pressing the corresponding pump select button and then pressing the authorization switch button 86. Similarly, each of the self-service pumps 10 may be cleared for authorizing the pump for a succeeding delivery by first depressing the pump select button and then depressing the paid switch button 88. The emergency switch button 90 when pressed provides for temporarily de-authorizing or de-energizing all of the self-service pumps. Each pump 10 can then be individually re-energized or re-authorized by depressing the pump select button and then the authorization switch button 86.

The auxiliary control module 78 comprises a suitable microprocessor 100 and an input multiplexor 102 to selectively connect the four bit input of the microprocessor 100 to the peripheral input bus, the control leads from the auxiliary console 72 and the interrupt control leads 72, 74. The microprocessor 100 has two sets of output latches 104, 106. The set of latches 104 provides for operating the multiplexor 102 and for supplying an interrupt request signal to an OR gate 107. The set of latches 106 is connected via a suitable encoder 108 to supply data to the peripheral output bus and also to supply data to a voice synthesizer 110. Accordingly, the microprocessor 100 is connected for communicating with the master control module 22 via the peripheral input bus and peripheral output bus. The operation of the push button switches of the auxiliary console 72 is thereby communicated to the master control module 22 for auxiliary operation of the primary control system 14. Also, the master control module 22 is thereby automatically interrogated to transmit any change in status of any of the self-service pumps 10 to the auxiliary module 78 for storage in a RAM 112 of the microprocessor 100.

The voice synthesizer 110 is connected via an amplifier 116 to three speakers 118–120. One speaker 120 is provided at the auxiliary console 72 and the two remaining speakers 118, 119 are mounted at or adjacent the self-service and full service areas 6, 8 respectively. The area speakers 118, 119 could be mounted for example centrally between the corresponding banks of self-service and attendant-operarted pumps, or for example as shown in FIG. 1 at the rear of the postpay station house with the speakers 118, 119 pointed at the two separate service areas respectively. Thus, the console speaker 120 is positioned to be heard by the station ttendant when he is operating the auxiliary console 72 and the area speakers 118, 119 are positioned to be heard throughout the respective self-service and full service areas.

The microprocessor 100 and voice synthesizer 110 are suitably programmed to provide a voice report of the identification of and cost amount of fuel delivered by each self-service pump after the completion of a self-service delivery (when the fuel pump handle 30 is turned to its vertical or off position). The completed delivery status is first communicated from the slave 24 to the master 22 and then from the master 22 to the auxiliary module 78 and stored in the microprocessor RAM 112. The cost amount of the completed delivery is then requested by the auxiliary module 78 and transmitted from the slave 24 and via the master 22 to a working memory of the microprocessor RAM 112. The microprocessor 100 then transmits the pump identification and delivery cost amount to the voice synthesizer 110 to operate the speakers 118–120 to annunciate a completed delivery report in linguistic form. For example, the voice synthesizer 110 would annunciate "Pump one owes five dollars and seventy-six cents."

It is preferable that the completed delivery voice report be automatically repeated at least once to ensure that the voice report is heard by both the station attendant and self-service customer. Also, the repeat push button 92 is operable to repeat the voice report of each completed self-service delivery not previously cleared. Thus, for example if self-service deliveries at pumps 1 and 3 have been completed and not yet cleared and the repeat button 92 is actuated, the cost amount of the two uncleared deliveries would be annunciated "Pump one owes five dollars and seventy-six cents; Pump three owes eight dollars and thirty-four cents."

The cost amount of each uncleared completed delivery could be retained in the working memory of the microprocessor RAM 112. Preferably, however, the microprocessor 100 is programmed to recall the cost amount of each completed and uncleared delivery from the corresponding slave module 24 (where it is stored until the delivery is cleared and the next delivery is authorized) when the repeat button 92 is actuated.

When a self-service pump handle 30 is turned to its horizontal or "on" position to request authorization for the delivery of fuel (and the pump has not been previously authorized), the request status is transmitted from the slave 24 via the master module 22 and auxiliary module 70 to the voice synthesizer 110 to annunciate for example "Authorize pump one." Also, if such delivery requests are made at more than one self-service pump, for example at self-service pumps 3 and 4, the voice synthesizer 110 would be operated to annunciate "Authorize pump three; Authorize pump four." Preferably, the auxiliary control module 78 provides the repeating the voice authorization request every ten seconds until the pump is authorized, excepting that the voice authorization request for any pump is not given until the preceding completed delivery at that pump is cleared either at the main keyboard 28 or auxiliary console 72.

Also, the voice synthesizer 110 is preferably operated by the auxiliary control module 78 to provide a first steady tone of predetermined frequency while any pump 10 is in use (i.e. while any pump remains in an authorized status) unless any pump remains in an unpaid completed delivery status, in which event a second steady tone of a different readily distinguishable frequency is produced.

Therefore, it can be seen that the auxiliary control system provides for annunciating in linguistic form each delivery request and the cost amount of each completed fuel delivery. The auxiliary control system also provides for annunciating with different background tones between such linguistic voice reports, either of two active conditions of the self-service delivery area. Such audio annunciations facilitate control of the self-service delivery area and collection of payment for each self-service delivery by the attendant. Also as an audio cost report is automatically made after the completion of each delivery (when the pump handle 30 is returned to its horizontal or off position), both the self-service customer and attendant are immediately advised of the payment due and any contemplated theft by the customer is discouraged.

As will be apparent to persons skilled in the art, various modifications, adaptations and variations of the foregoing specific disclosure can be made without departing from the teachings of the present invention.

I claim:

1. In a hybrid fuel delivery system having separate self-service and attendant-operated fuel delivery areas with a plurality of separate self-service and attendant-operated fuel delivery dispensers respectively and a fuel delivery control system having a first central station control system electrically connected to each self-service dispenser and comprising register means selectively operable for registering the amount of a completed fuel delivery by each self-service dispenser and first control means with a first set of manually operable switches and selectively manually operable thereby to selectively activate each self-service dispenser for self-service delivery of fuel and selectively operate the register means to register the amount of a completed fuel delivery by each self-service dispenser, the improvement wherein the fuel delivery control system further comprises a second remote station control system having remote sound annunciator means selectively operable for audibly annunciating the amount of a completed fuel delivery at the separate self-service and attendant-operated areas and second control means electrically connected to the central station control means and having a second remote set of manually operable switches and selectively manually operable thereby to selectively remotely operate the central station control means, in place of said first set of switches, to selectively activate each self-service dispenser for self-service delivery of fuel, the remote station control means being operable by the central station control means after completion of a fuel delivery by each self-service fuel dispenser to operate the sound annunciator means to audibly annunciate the amount of the respective completed fuel delivery at the self-service and attendant-operated areas.

2. A hybrid fuel delivery system according to claim 1 wherein the sound annunciator means comprises speaker means and voice synthesizer means connected for operating the loudspeaker means to audibly annunciate the amount of a completed fuel delivery in linguistic form.

3. A hybrid fuel delivery system according to claim 2 wherein the speaker means comprises separate speakers adjacent the separate self-service and attendant-operated fuel delivery areas respectively.

4. In a fuel delivery control system for a fuel delivery system having a vehicle self-service fueling area with a plurality of self-service fuel delivery dispensers for self-service delivery of fuel by a plurality of self-service customers, the fuel delivery control system having a central station control system adapted to be electrically connected to each self-service dispenser and comprising register means selectively operable for registering the amount of a completed fuel delivery by each self-service dispenser and first control means with a first set of manually operable switches manually operable thereby to selectively activate each self-service dispenser for self-service delivery of fuel and selectively operate the register means to register the amount of a completed fuel delivery by each self-service dispenser, the improvement wherein the fuel delivery control system further comprises a second remote station control system having remote sound annunciator means selectively operable for audibly annunciating in linguistic form the amount of a completed fuel delivery and second control means connected to the central station control means and having a second remote set of manually operable switches and selectively manually operable thereby to selectively remotely operate the central station control means, in place of said first set of switches, to selectively activate each self-service dispenser for self-service delivery of fuel, the remote station control means being operable by the central station control means after the completion of a fuel delivery by each self-service fuel dispenser to operate the sound annunciator means to audibly annunciate the amount of the respective completed fuel delivery in linguistic form.

5. A fuel delivery control system according to claim 4 wherein the sound annunciator means comprises speaker means and voice synthesizer means connected for operating the speaker means to audibly annunciate in linguistic form the amount of a completed fuel delivery and the identification of the respective self-service dispenser.

6. In a hybrid fuel delivery system having separate self-service and attendant-operated fuel delivery areas with a plurality of separate self-service and attendant-operated fuel delivery dispensers respectively and a fuel delivery control system having a self-service control system electrically connected to each self-service dispenser and comprising annunciator means operable for annunciating the amount of a completed fuel delivery by each self-service dispenser and control means for operating the annunciator means and having a set of manually operable switches and selectively manually operable thereby to selectively activate each self-service dispenser for self-service delivery of fuel, the improvement wherein the annunciator means comprises sound annunciator means operable for audibly annunciating in linguistic form the amount of a completed fuel delivery and the identification thereof by identification of the corresponding dispenser and wherein the control means is automatically operable after the completion of a fuel delivery by each self-service fuel dispenser to operate the sound annunciator means to audibly annunciate in linguistic form the amount and identification of the respective completed fuel delivery.

7. In a fuel delivery control system for a fuel delivery system having a vehicle self-service area with a plurality of self-service fuel delivery dispensers for self-service delivery of fuel by a plurality of self-service customers, the fuel delivery control system having a self-service control system electrically connected to each self-service dispenser and comprising annunciator means operable for annunciating the amount of a completed fuel delivery by each self-service dispenser and control means with a set of manually operable switches and selectively manually operable thereby to selectively activate each self-service dispenser for self-service delivery of fuel and for operating the annunciator means to annunciate the amount of a completed fuel delivery by each self-service dispenser, the improvement wherein the annunciator means comprises sound annunciator means operable for audibly annunciating in linguistic form the amount of a completed fuel delivery and wherein the control means is automatically operable after the completion of a fuel delivery by each self-service fuel dispenser to operate the sound annunciator means to audibly annunciate in linguistic form the amount of the respective completed fuel delivery, the sound annunciator means comprising speaker means and voice synthesizer means connected to the speaker means for said annunciation of the amount of a completed fuel delivery.

8. A fuel delivery control system according to claim 7 wherein the speaker means comprises at least one speaker at the vehicle self-service area for said audible annunciation to self-service customers.

9. A fuel delivery control system according to claim 7 or 8 wherein the speaker means comprises at least one speaker remote from the vehicle self-service area for said audible annunciation at a remote station for assisting attendant collection of payment for the self-service delivery.

10. A fuel delivery control system according to claim 7 or 8 wherein the annunciator means is operable by the control means for sound annunciation of the status of the fuel delivery system.

11. A fuel delivery control system according to claim 10 wherein the annunciator means is operable by the control means for sound annunciation of said status with a steady audible tone.

12. A fuel delivery control system according to claim 7 or 8 wherein each self-service dispenser is operable by a self-service customer to request a self-service delivery and wherein the annunciator means is operable by the control means to audibly annunciate in linguistic form a dispenser activation request by a self-service customer.

* * * * *